(12) United States Patent
Findlay

(10) Patent No.: US 9,523,346 B2
(45) Date of Patent: Dec. 20, 2016

(54) MODULAR ARRAY TYPE ENERGY CONVERTER

(75) Inventor: David John Findlay, Innerleithen (GB)

(73) Assignee: ALBATERN LIMITED, Midlothian (GB)

( * ) Notice: Subject to any disclaimer, the term of this patent is extended or adjusted under 35 U.S.C. 154(b) by 1207 days.

(21) Appl. No.: 13/144,732

(22) PCT Filed: Jan. 14, 2010

(86) PCT No.: PCT/GB2010/000063
§ 371 (c)(1),
(2), (4) Date: Sep. 8, 2011

(87) PCT Pub. No.: WO2010/082033
PCT Pub. Date: Jul. 22, 2010

(65) Prior Publication Data
US 2011/0308244 A1   Dec. 22, 2011

(30) Foreign Application Priority Data

Jan. 16, 2009   (GB) .................................. 0900685.9

(51) Int. Cl.
*F03B 13/20* (2006.01)
*F03B 13/16* (2006.01)
(Continued)

(52) U.S. Cl.
CPC ............... *F03B 13/20* (2013.01); *F03B 13/16* (2013.01); *F03B 13/1815* (2013.01); *B63B 22/04* (2013.01);
(Continued)

(58) Field of Classification Search
CPC .......... Y02E 10/32; Y02E 10/38; F03B 13/20; F03B 13/1815; F03B 13/14; F03B 13/16; F03B 13/1885; F03B 13/1895; F05B 2250/283; F05B 2240/93; B63B 22/04
(Continued)

(56) References Cited

U.S. PATENT DOCUMENTS 4,077,213 A   3/1978   Hagen
4,098,084 A *  7/1978   Cockerell ............... F03B 13/20
                                                       417/332
(Continued)

FOREIGN PATENT DOCUMENTS

FR   2 382 596   9/1978
GB   1 448 204   9/1976
(Continued)

OTHER PUBLICATIONS

International Search Report for PCT International Application No. PCT/GB2010/000063 mailed Mar. 11, 2011.

*Primary Examiner* — Thomas Denion
*Assistant Examiner* — Xiaoting Hu
(74) *Attorney, Agent, or Firm* — RatnerPrestia

(57) ABSTRACT

A wave energy transformation device including an array of members connected together to form a structure having a substantially hexagonal geometry, the array has link members, nodes and absorbers and the relative motion of at least some of the members of the array, as caused by the energy of wave motion in a medium to which the array is coupled is convertible to another form of energy. The device is suitable for generating electrical energy from sea waves.

28 Claims, 10 Drawing Sheets

(51) Int. Cl.
  *F03B 13/18* (2006.01)
  *B63B 22/04* (2006.01)
(52) U.S. Cl.
  CPC ........ *F05B 2240/40* (2013.01); *F05B 2240/93* (2013.01); *F05B 2250/283* (2013.01); *F05B 2260/40311* (2013.01); *Y02E 10/38* (2013.01)
(58) Field of Classification Search
  USPC ......... 60/495–507; 290/42, 53; 417/330–333
  See application file for complete search history.

(56) References Cited

U.S. PATENT DOCUMENTS

| | | | |
|---|---|---|---|
| 4,105,368 A | | 8/1978 | Waters |
| 4,118,932 A | | 10/1978 | Sivill |
| 4,210,821 A | | 7/1980 | Cockerell |
| 4,684,815 A | | 8/1987 | Gargos |
| 4,686,377 A | | 8/1987 | Gargos |
| 4,742,241 A | * | 5/1988 | Melvin ............ 290/53 |
| 4,792,290 A | | 12/1988 | Berg |
| 2007/0257491 A1 | * | 11/2007 | Kornbluh et al. ........ 290/53 |
| 2008/0267712 A1 | * | 10/2008 | Jean et al. ........ 405/76 |
| 2009/0183667 A1 | | 7/2009 | Draper et al. |
| 2010/0230965 A1 | * | 9/2010 | Pitre et al. ........ 290/42 |

FOREIGN PATENT DOCUMENTS

| | | |
|---|---|---|
| WO | WO 00/17519 | 3/2000 |
| WO | WO 01/92644 A1 | 12/2001 |
| WO | WO 2007/106323 A2 | 9/2007 |

\* cited by examiner

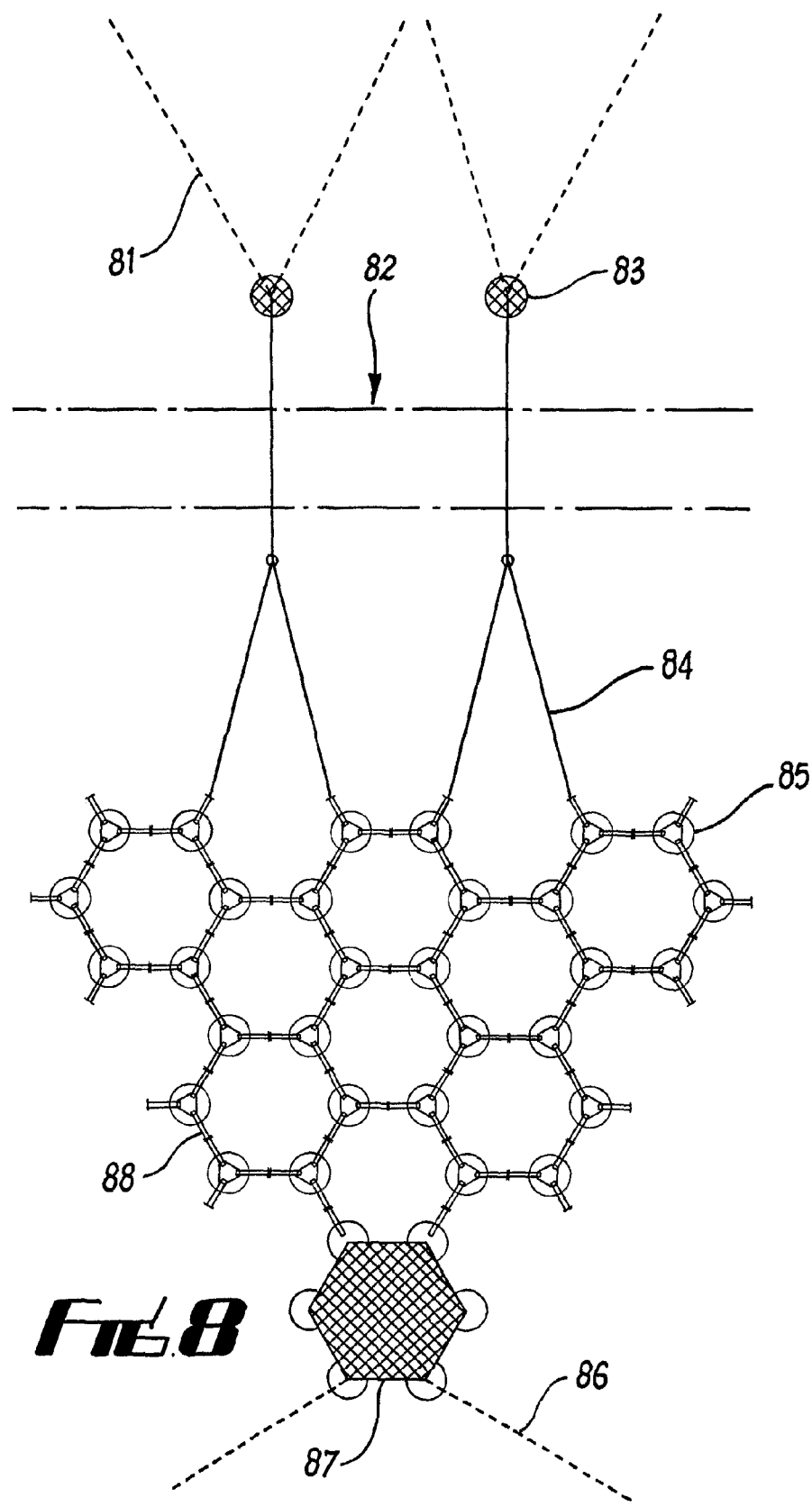

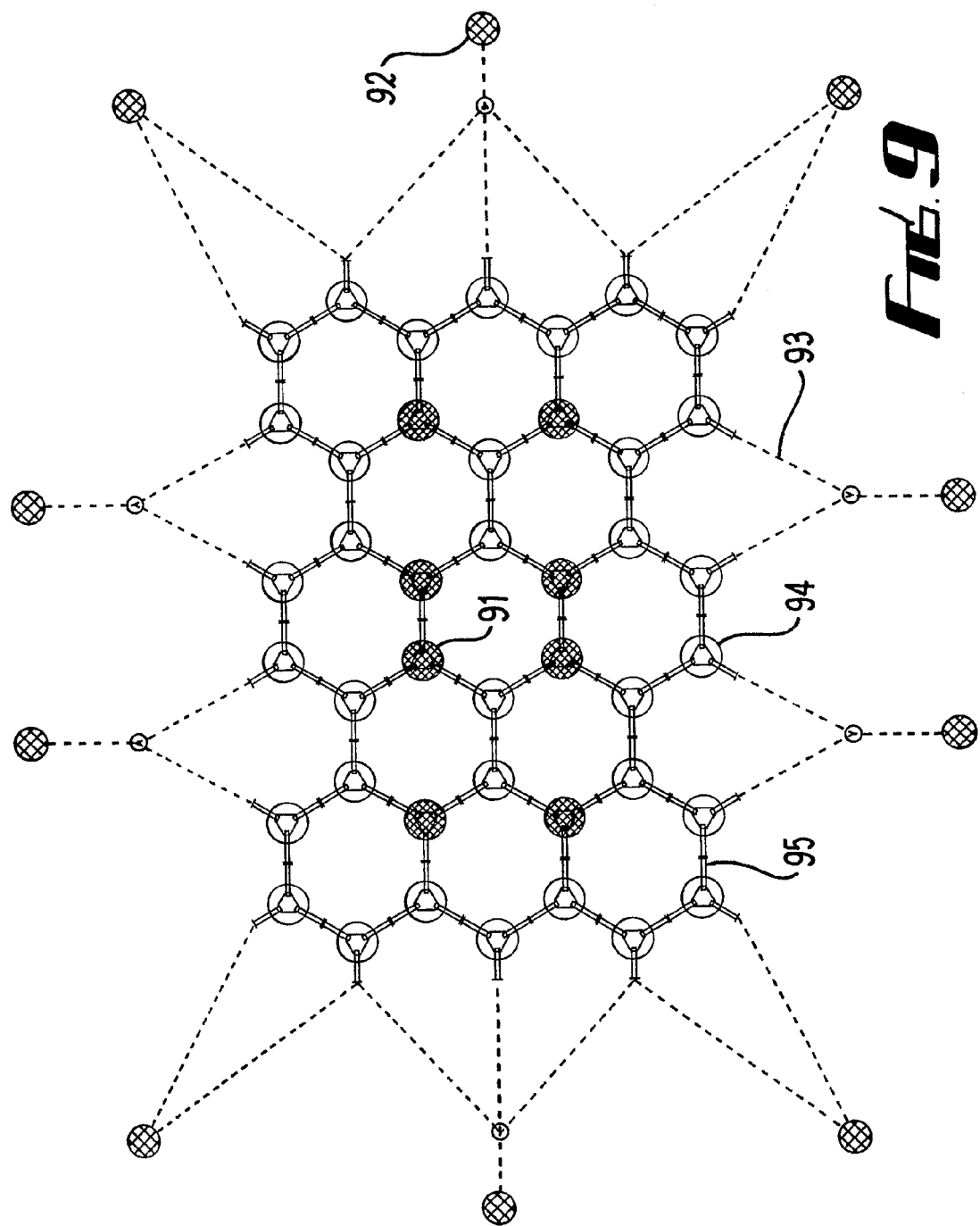

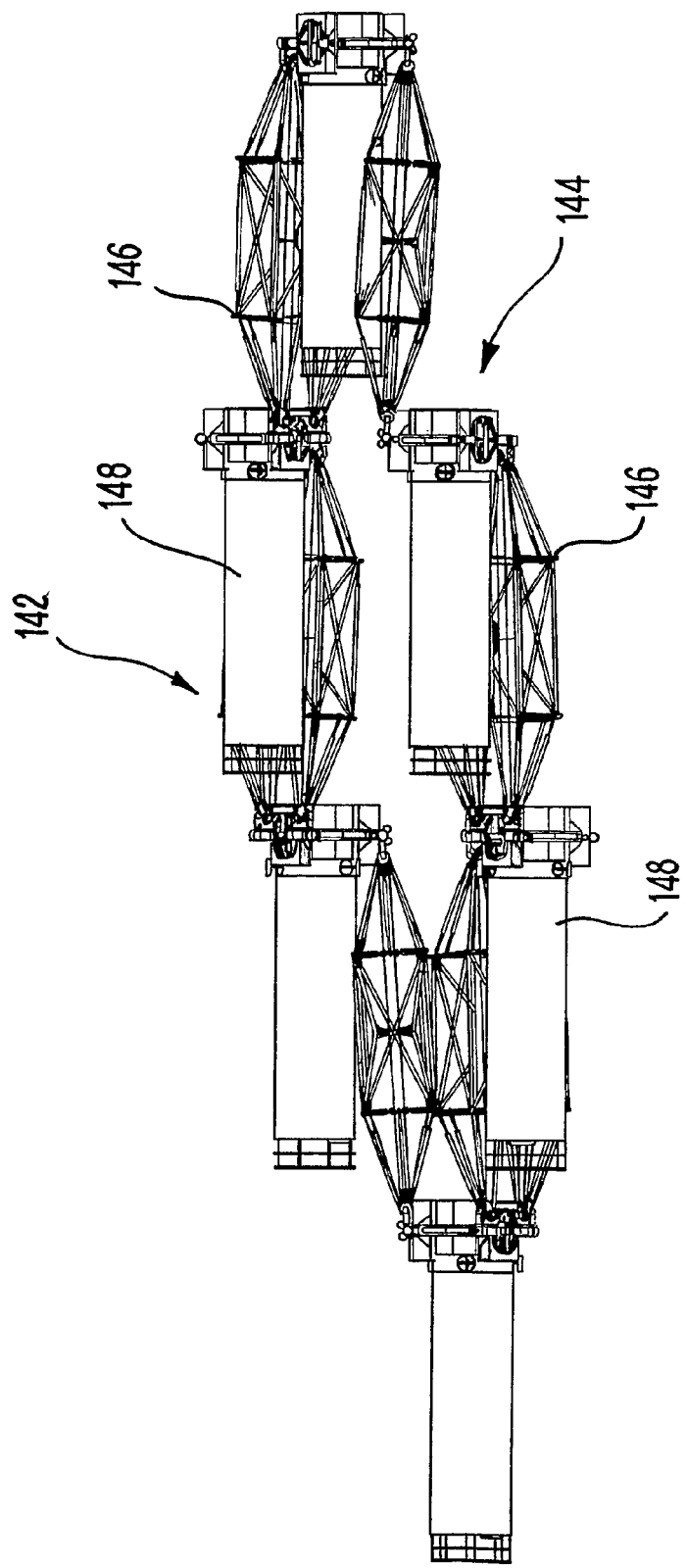

MODULAR ARRAY TYPE ENERGY CONVERTER

This application is a U.S. National Phase Application of PCT International Application No. PCT/GB2010/000063, filed Jan. 14, 2010.

FIELD OF THE INVENTION

The present invention relates to the field of wave energy and more specifically to a device for the capture, conversion and transmission of that energy.

BACKGROUND TO THE INVENTION

A wide variety of methods and apparatus have been designed for the conversion of the energy in sea waves.

Relevant prior inventions include patent documents U.S. Pat. No. 4,077,213, U.S. Pat. No. 4,210,821, U.S. Pat. No. 4,118,932, U.S. Pat. No. 4,686,377, GB1448204 and U.S. Pat. No. 4,684,815. These patents all describe mechanisms for the capture of wave energy based on an arrangement of rafts or floats, either fixed to a permanent base or a moored structure.

These documents, and others, suggest the use of hydraulic take-off systems based on sea water as the working fluid. Three patents suggest the use of single degree of freedom joints and all share a configuration based on a chain of articulated floats with the axis of rotation aligned parallel to each other and perpendicular to the incoming wave direction More recently WO 00/17519 describes an apparatus composed of a long chain of predominantly cylindrical members capable of controlled motion in 2 degrees of freedom.

The complexity and high capital expenditure associated with developing an offshore wave energy converter has limited the progress of the vast majority of devices.

Travelling ocean waves are a mechanism of energy transmission. The frictional interaction of wind at the air water interface, or sea surface, with the slower moving, and considerably denser, water particles results in a transfer of energy and the creation of ocean waves.

Beneath the sea surface, the energy flux manifests itself as three dimensional pressure and velocity fields. The transmission of energy occurs through the elastic vibration of these fields, with the pressure component manifesting itself as an elevation of the local surface, and therefore potential energy, while the complementary velocity field manifests itself as kinetic energy. In this way, energy is continually transformed between these two types of energy, the transformation being so conservative that a deep water wave can travel several thousand kilometers and lose only a few percent of the energy it started with. The energy in the waves is not restricted to the free surface, nor is it present in the full extent of the water column; rather it decreases exponentially.

It is convenient to conceptualise the wave regime as a regular wave, but in reality a real sea state will be composed of a superposition of many waves. This results in a spectrum where the energy, or quantity, of waves of a particular frequency can be represented by a single equation.

Furthermore a real sea state comprises not only of waves of varying frequency but also of varying direction. This situation tends to depend on the geography of the deployment site. In locations where a long fetch is present such as the west coast of the European continent or the south coast of New Zealand, travelling waves will have more time, and encouragement, to synchronise their periods and direction of travel. In this situation waves will exhibit less directional spreading and will tend to be larger with a more defined peak in the spectrum. By contrast, regions where more than one possible fetch exists—such as the North Sea or the northwest coast of New Zealand—or where reflection or shorter fetches are present waves will tend to show more spreading in both their frequency and direction.

The energy transmitted by a travelling wave has a dependence upon the square of the wave height. Revenue from a wave energy conversion plant is directly dependant upon the power produced which is clearly dependant on the energy available to the absorber. A good wave energy site is conventionally defined as one having a mean power density of between 20 and 70 kW/m. It should be noted that while many sites with these densities exist, there are many more that fall beneath this threshold.

Historically, the development of wave energy converters has been an inherently risky undertaking. Of the devices deployed to date, 80% or more have failed—a significant number ending up on the seabed or washed up on the beach.

A further difficulty with developing wave energy devices for the more aggressive offshore sites is that the efficiency of capture, or absorption, of the energy in the waves depends to some extent on the size of the device. To achieve good absorption, a small device will require an amplitude of motion considerably larger than the amplitude of the incident waves. Through complex control this is possible to a certain extent, but it is difficult, and more so as additional degrees of freedom are included.

By contrast, however, a small device has many operational advantages over larger devices. A small device will be less likely to suffer from internal stresses due to variations in pressure loading across the structure, and will therefore gain through reduced material costs. It will also be considerably cheaper to install.

Experience with wave energy deployments to date has shown that the cost of marine operations, particularly mooring operations, accounts for a significant proportion of the overall project cost (typically ~50%). An economically viable marine energy device will therefore require an efficient mooring and operations procedure.

Furthermore, the mooring and deployment operation is not always a 'once in a lifetime' event for many current designs. Wave energy devices tend to be complicated dynamic machines with multi-component power take off systems and many unavoidable failure mechanisms. A few devices such as WaveDragon and the Orecon multi-chamber resonant OWC are being designed so that general maintenance operations can be carried out on-site, however, they pay for this advantage with increased size and one off mooring costs.

The majority of designs currently under development fall under the category of single point absorbers, and a majority of these aim to capture energy from a single degree of freedom—usually heave. There are, however, other approaches that have either been proposed or are under active research. Perhaps the most famous of these being Salter's Duck.

Generally speaking a wave energy PTO (Power Take Off) system will aim to achieve the following:
1) Rectification of the energy flow—to allow power capture both on the out and return strokes.
2) Step up in speed, to allow smaller secondary electrical conversion machinery
3) Power smoothing to allow generators to operate closer to optimum efficiency and for grid compliance.

Many PTO systems have been proposed for wave energy conversion. Each of them has their advantages and disadvantages. Some existing approached are summarised in the following:

Hydraulic systems have long been considered suitable for the primary PTO conversion stage.

However they require a sophisticated system with many auxiliary systems such as cooling, redundancy, and control. High pressure hoses are a notorious cause of failure especially when subjected to pulsating loads and when the hoses are required to pass fluid across moving joints. The latter difficulty can be alleviated by using rotating unions in the case when the joint has one, rotating, degree of freedom.

The control system of a marine energy device is required to perform several tasks. These include optimising the performance and protecting the system. From the point of view of performance, this typically implies a control over the load seen by the primary conversion device such that the hydrodynamic efficiency of the absorber is maximised.

Power is the product of force and velocity, therefore the foremost requirement for hydrodynamic efficiency is that the force and velocity vectors are aligned. The condition when this happens throughout a wave cycle is referred to as resonance. Essentially the absorber should be moving away from the applied force at all times. If this does not happen and the velocity and force vectors are in opposing directions, the kinetic energy of the absorber will be transferred to the fluid and power will be lost from the system. Several control strategies have been proposed and developed for wave energy devices.

The simplest type of performance control is not to have control at all. In this instance a constant damping (proportional to velocity) is applied to the primary conversion device throughout the wave cycle.

One particular problem specific to wave power converters is the so called end stop problem. Physical limitations exist for linear conversion drives such as hydraulic rams or direct drive linear generators that restrict the stroke, or range of motion, of these primary conversion units. There is a certain probability that a given wave energy converter, installed in a specific site, will encounter waves above a certain amplitude. It is not generally economically efficient to design the system to accommodate the largest wave that the device may experience; therefore a situation will occur where a system equipped with a driven linear drive will be required to restrict the response of the system to protect the end stops of the primary power take off component.

Many of the difficulties in designing an economically viable marine energy converter stem from the unpredictability of the marine environment. Structures must be designed and built to withstand the highest waves which may occur only very rarely yet exert disproportionately high forces yet, at the same time; they must also be built to generating efficiently in the smaller waves which are much more common. All power take off components need to be rated to the highest powers, whether it be hydraulic, mechanical or electrical, that they are likely to experience during their lifetime. The device must be able to protect itself in the event that it is subject to incident powers above this rating and this may require the offloading of power take off systems and the dissipation of excessive power.

It is an object of the present invention to address at least some of the issues identified above.

SUMMARY OF THE INVENTION

In at least one aspect of the present invention, the device of the present invention provides a wave energy converter for converting energy in water waves. The wave energy converter is floating, compliantly moored and self reacting. Energy can be captured from pitching, rolling and heaving motions and from waves of any direction.

In accordance with a first aspect of the present invention there is provided a wave energy transformation device comprising an array of members connected together to form a structure having a substantially hexagonal geometry, wherein the relative motion of the members of the array, as caused by the energy of wave motion in a medium to which the array is coupled is convertible to another form of energy.

Preferably, the array of members comprises link members nodes and absorbers.

Preferably, the link members comprise a body designed such that it can support a rotating connection at either end.

Preferably, the link body is rectangular in the horizontal plane and the rotating connection is of the single degree of freedom type with an axis parallel to the shorter of the two sides of the rectangle.

Preferably, the node is adapted to receive three link members with an angular spacing of around 120°. This provides the substantially hexagonal geometry of the array.

Preferably, the node member further comprises three joint mechanisms, such that a connection to the corresponding joint mechanism at one end of a link member is facilitated.

Preferably, the node contains a buoyancy element that restrains, through the action of gravity and hydrostatic force, the vertical location of the plane of the joint mechanisms relative to the air water interface.

Preferably, the buoyancy element is maintained at an offset from joint mechanisms such that the joint mechanisms are located substantially beneath the most aggressive motions of the wave particles as explained by the exponential decay of said particles motion with depth.

Preferably, the offset between the joint mechanisms and the buoyancy element can be varied to allow the device to be tuned to a specific wave climate.

Preferably, the ratio between the mass and displacement of the buoyancy element can be varied to allow the device to be tuned to a specific wave climate and to be partially submerged during extreme weather.

Preferably the ratio between the mass and displacement of the buoyancy element is varied by the controlled flooding of buoyancy compartments within the buoyancy element.

Preferably, the distance between the centre of buoyancy and the centre of mass may be varied to favourably alter the dynamic properties of the array.

Preferably, the absorber is attached to the node such that it shares an axis about which its form is axisymmetric and the form of the node is also axisymmetric.

Preferably, the absorber is substantially spherical or axisymmetric in form.

Preferably, the absorber is large relative to the buoyancy element.

Preferably, the absorber is substantially neutrally buoyant or maintains slight positive buoyancy.

Preferably, sub-assemblies of nodes, links and absorbers are further assembled to create a wave energy transformation device arranged in a six sided or hexagonal array of members.

Preferably, the array when deformed by a naturally occurring wave pattern use the reactive forces of its members in such a way as to permit the transformation of the wave energy into another form of energy.

The angular adjustment between the links and nodes that accompanies deformation of the structure is a relative motion that is expressed at the joints between the link and node members. It is therefore possible to capture energy from this motion.

Preferably, the device of the present invention uses the geodesic properties of its substantially hexagonal form to conform to natural wave patterns.

Preferably, the energy of the relative motion of the link members, nodes and absorbers is captured by a primary conversion device.

Preferably, the primary conversion device transforms kinetic energy from the rotational motion of the joint mechanism and the translational motion of the absorber relative to the node.

Preferably, each node contains one or more primary conversion devices.

Preferably, a means for aggregating the power output from individual primary conversion devices within the array is used to smooth the power developed by the device.

Preferably, a secondary conversion device as used for the further conversion of power to a more useful form is installed in one or more of the nodes.

Preferably, the transformation to another energy form can take place either within the structure itself or in a shore based station.

Preferably, the motions of adjacent nodes are mechanically coupled to provide a complimentary restorative force that acts to enhance the power capture characteristics of the device.

Preferably, the untransformed or the transformed energy is transmitted to shore by means of an umbilical cable or pipe.

Preferably, the device can use its own created energy to rebalance its floatation system to allow it to sink below surface level during periods of bad weather.

Alternatively, the waves are of another type, or in another medium than water.

Optionally, the device is for the production of power or any other product that may be sold to generate revenue.

In accordance with another aspect of the invention there is provided a support structure to which an energy conversion apparatus is attachable, the support structure comprising:

an array of members connected together to form a structure having a substantially hexagonal geometry, wherein the relative motion of the members of the array, as caused by the energy of wave motion in a medium to which the array is coupled allows the support structure to move with the motion of the waves.

As set out above, the general structure defined above can also be used as a support sub-structure to which other energy conversion apparatus may be attached.

In the preferred embodiment, the sub frame is suspended from vertical—predominantly cylindrical, although not necessarily so—buoyant elements located at each of the nodes of the array. This allows the sub frame, and all components mounted directly on the frame, to be located in a region that is removed from the more aggressive energies densities immediately beneath the free surface. In this instance the buoyant elements will support the structural weight of the frame. It is envisaged that these elements will be surface piercing, and therefore a proportion of their volume will protrude above the free surface thereby reducing the possibility of complete submergence and creating a definite restoring force in the event that individual elements are partially, or completely, submerged.

Absorption of energy is increased by the inclusion of a comparatively large yet substantially neutrally buoyant structure (absorber) that is attached such that it shares a common axis with the cylindrical buoyant member and is free to move relative to the sub frame in one, or more, degrees of freedom.

The absorbers are further constrained by an assemblage of connectors, which may be either rigid or flexible, such that they conform to the arrangement of the supporting sub frame. In the present embodiment that arrangement is such that three connectors restrain each absorber resulting in an angle of 120 degrees between adjacent connector attachment points on the absorbers. The connectors are attached to the sub-frame by means of a connection that is configured such that the absorber can track out a substantially orbital motion in the vertical plane when referenced to the global co-ordinate system.

In accordance with an aspect of the present invention there is provided an array of members connected together to form a structure having a substantially hexagonal geometry, wherein the relative motion of the members of the array, as caused by the variation in energy in a medium to which the array is coupled, is used in an energy conversion process that may either result in a net gain of information or useful energy for the operator of the device.

Preferably, the device is used in the conversion of ocean wave energy and where the array of members comprises link members and nodes.

Preferably, the link members comprise a body designed such that it can support a rotating connection.

Preferably, the rotating connection is of the single degree of freedom type.

Preferably, the node contains three joint attachments substantially equally spaced around a central axis.

Preferably, in use, node and link members are attached via predominantly rotating joints.

Preferably, a sub-frame comprising nodes and link members is maintained at the sea surface during normal operation by the mutual interaction of gravity and buoyancy.

Preferably, the sub-frame comprising nodes and link members is suspended beneath the sea surface during normal operation by the mutual interaction of gravity and buoyancy.

Preferably, buoyancy elements attached to the nodes of the sub-frame control the depth of submergence of the sub-frame.

Preferably, an energy absorption body, is included at each node location and allowed to translate relative to the node such that the power capture characteristics of the sub frame are improved.

Preferably, a mechanical, electrical, hydraulic or pneumatic coupling between adjacent energy absorption bodies is used to improve the power conversion characteristics of the device by introducing a coupling driving force that acts to improve the correlation between the forces on, and motion of, individual absorbers.

Preferably, kinetic energy in the angular motion of the joint mechanism between links and nodes is converted to another form using any combination of known technologies.

Preferably, the kinetic energy in the translational motion of the absorber relative to a node is converted to another form using any combination of known technologies.

Preferably, the energy transformation device further comprises an assembly of the following mechanical components: step up gearbox, rectification gearbox, flywheel and differential drive, which produce a steady, or quasi steady, unidirectional power flow to an electrical generator.

Preferably, the energy transformation device further comprises an assembly of hydraulic devices which produce a steady, or quasi steady, unidirectional power flow to an electrical generator.

Preferably, the pump system can be used for pumping a liquid, preferably hydraulic fluid or water, but may be any other liquid or gas.

Preferably, the energy transformation device further comprises a multiple inlet/multiple outlet manifold for use in power transmission and power smoothing.

Preferably, a variable speed drive or assembly of power conditioning electronic devices is used to produce a steady, or quasi steady, unidirectional power flow to an electrical generator.

Preferably, the variable speed drive or assembly of power conditioning electronic devices is used to damp unwanted mechanical vibrations or otherwise control the mechanical response of the structure.

Preferably, the outputs from an array of electrical generators are combined, preferably using power conditioning components, before being transmitted to shore via an umbilical connection.

Preferably, the transformation from one energy form to another energy form can take place either within the structure itself or in a shore based station.

Preferably, some nodes may contain energy conversion components while other nodes do not.

Preferably, the link members and nodes can be elevated, partially or substantially, above the free surface to form a network of walkways allowing limited on site maintenance and repair.

Preferably, where elevation of the sub-frame is carried out using adjustable ballast and buoyancy systems.

Preferably, elevation of the sub-frame is achieved by mechanically varying the position of the buoyancy element relative to the node.

Preferably, the elevation, or submergence, of the sub-frame relative to the sea surface can be varied to enhance the performance of the device or to protect the device.

Preferably, the device can use its own created energy to rebalance its floatation system to allow it to sink below surface level during periods of bad weather.

Preferably, flexible elements are used in place of rigid link members.

Preferably, the structure can be folded, reconfigured or aligned in any way during marine operations to ease the handling or maneuverability.

Preferably, the structure is maintained on station during normal operation by a mooring attachment of any type to the sea bed or any other structure.

Preferably, the structure is maintained on station during normal operation by a mooring attachment of any type to the sea bed or any other structure.

Preferably, mechanisms exist such that critical components—which may be links, nodes, absorbers or any power conversion machinery—may be removed from the array during operation, or whilst on site.

BRIEF DESCRIPTION OF THE DRAWINGS

The invention will now be described by way of example with reference to the accompanying drawings in which:

FIG. 8 is one possible deployment configuration; and

FIG. 9 is another possible deployment configuration;

FIG. 11 shows the device in a possible transport configuration;

DETAILED DESCRIPTION OF THE DRAWINGS

Figure 1:
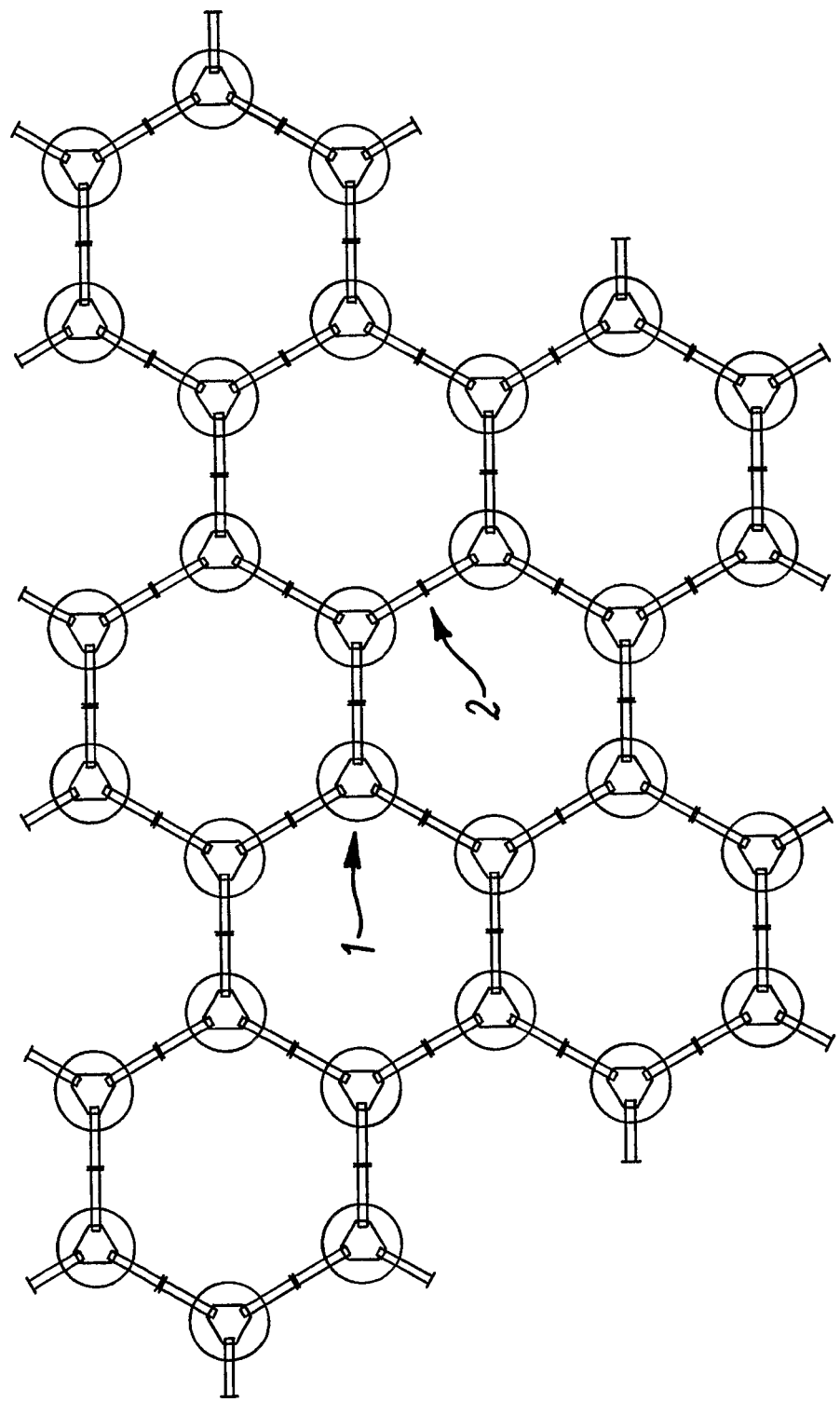
FIG. 1 illustrates the hexagonal configuration in plan view.

In addition to the embodiments described in relation to the drawings, other possible alternative designs and components that fall within the scope of the invention are described below.

The invention comprises several parts. These will be described in detail in the following sections.

In one embodiment, the device has the appearance of a hexagonal or six sided array. Each enclosed hexagon is assembled from two basic components. These are:

1) A link member 2 whose simplest configuration is a single rectangular body designed such that it can support a rotating connection at either end. Ideally the rotating connection will be of the single degree of freedom type with an axis parallel to the shorter of the two sides of the rectangle. In general, it is more likely that the link member will comprise an assembly of components, of which two, or more longitudinal, and substantially parallel, elements will form the basis and the main stress path between the two end nodes. In addition to the main structural members, additional link members can be used to brace the structure and enhance the overall structural integrity.

2) A node member 1, that, when shown in the plan view, has the form of a triangular or 'Y' shape such that it has 3 lines of symmetry equally spaced by an angle of 120 degrees. This member further includes three joint mechanisms, again substantially equally spaced around the node member, such that a connection to the corresponding joint mechanism at one end of a link member is facilitated.

From a plurality of these two components—or, to be exact, from a total of six link members and six joint members—it is possible to construct an array in accordance with the present invention.

It is a feature of this design that the array may be extended beyond a single hexagon by the inclusion of additional link and node members as appropriate In this way, it is extensible such that its extreme dimensions are undefined.

The relevance of the array in accordance with the present invention is that it has the ability to deform in a dynamic and coherent fashion when a time and spatially variant force is applied across its extent. The nature of this deformation can be complicated, but the existence of multiple planes of symmetry within the structure, means that it is substantially insensitive to the direction of a particular force on a particular element, and more so, insensitive to the direction of travel of a force vector as it moves through time.

The structure as defined here can efficiently profile a surface that is contoured in two dimensions. The exactness to which the surface can be profiled depends on the size of the components within the array, with smaller components provided a tighter alignment than larger ones. Likewise a sharper contour will be less well approximated than a gradual one. It is the ability of the structure to continuously deform and therefore respond dynamically to the passage of undulations in an energy landscape that makes it attractive for absorbing the energy in a wave field.

In this example, the macro deformation of the array is accomplished by progressive angular adjustments in the successive joints as described previously. The configuration can comfortably deform to a complex surface as generated by energy waves travelling from several directions using only single degree of freedom joints. While this may be the simplest structure to construct and assemble, it is possible that the inclusion of additional flexibility in other modes, such as, for instance, allowing a certain amount of freedom to rotate around the longer axis of the link, or indeed allowing some spring resisted freedom between the primary axis of rotation and the node structure, may be beneficial in terms of reducing the peak internal stresses inside the structure of the array.

It is considered a novel feature of this invention to employ a hexagonal configuration of absorber nodes to the problem of wave energy conversion. In addition to the ability of the structure to deform in a fashion that allows it to dynamically track a complex surface, the configuration allows for the largest surface area to be covered using a relatively small volume of structural material. This fact acts to reduce the unit material costs, and consequently improve the overall economic viability of the design substantially. The design presented here is considered to provide the ultimate balance between strength and flexibility and the focus on the 'light-weight and economical' use of materials approach is considered to be unusual within the prior art.

The angular adjustment that accompanies macro deformation of the structure is a relative motion that is expressed at the joints between the link and node members. It is therefore possible to capture energy from this motion using standard, and less standard techniques.

Coupling

As described previously, one determining feature of a wave energy converter is the parameter better known as the bandwidth. Generally speaking this parameter measures the sensitivity of the performance of the device to the frequency of the incoming waves. A high bandwidth device will exhibit good absorber behaviour across a wide range of frequencies, a low bandwidth device, by contrast, will have a dominant frequency where the efficiency of conversion will be greatest and performance will be expected to drop off as the frequency of the incident waves deviates from this point. A high bandwidth device is a more economically attractive proposition than a low bandwidth device. Several approaches have been suggested to increase the bandwidth of a wave energy converter.

Generally a floating body will exhibit a natural frequency in each of the modes for which a restoring force is present (i.e. pitch, heave and roll). The frequency for each mode is dependant upon the ratio of the restoring force and the inertia of the body moving in that mode. It is when the natural frequency is close to the frequency of the incident wave that a good performance is to be expected, as in this scenario the body will start to resonate with the waves and see the displacement angle or stroke tend to a maximum. Of the two determining parameters, it is easier to vary the restoring force than the inertia, and many of the more sophisticated designs employ this strategy to increase the performance of their devices. In practice the PTO system can be used to impart a force of the correct magnitude, phase and direction to the moving body, which, despite necessitating an energy flux from the PTO system to the body, can significantly improve the overall performance of the design in a real sea state. The main difficulties with this approach are that the system requires a fairly complicated control system, a fully reversible PTO, and knowledge of the next wave, or the condition of the sea that the device will encounter at some point in the immediate future.

By using the interconnected array of absorbers as described in this invention, the control requirement can be dramatically simplified, and indeed can be achieved, to some good approximation, by a purely mechanical coupling 27,32 between adjacent nodes. In this way, the device can be described as self-tuning, a particularly attractive, and potentially novel, feature of the present invention.

It is not regarded as sufficient merely to connect two nodes together by way of a single rigid connector as this will result in the situation where a movement of one node must entail a similar, and instantaneous, movement of its partner and that of its connected nodes throughout the array. In this instance the array will move as one element, yet a real wave travels with a finite speed (related to its frequency) and different waves have different frequencies and therefore speeds. The wave must be allowed to propagate through the array, and the array must be able to adapt to the speed of this propagation.

A far more suitable approach is to connect the absorbers 33 together by means of a common attachment 31 on the link frame. In this instance a movement of one absorber (whether heaving relative to the sub frame, or pitching with the node) will impart a force on an adjacent absorber, however this absorber is not constrained to respond to the force through motion in any one of its modes, but rather can make a decision based upon the hydrodynamic forces acting on it at that time. For example an absorber, adjacent and to the right of an absorber that is moving from right to left in response to the action of an incident wave, will experience a force similarly acting from right to left. If, however, this node happens, due to the wavelength of the incident wave, to be experiencing a hydrodynamic force acting from left to right then the absorber itself can respond by moving in a predominantly heaving direction. This interestingly enough corresponds to the likely scenario that could cause this situation in the first place (i.e. the instantaneous position of the absorber is close to a crest, or trough of the wave field). Early prototype tests of the device have verified this behaviour to exist across a wide range of frequencies and thereby confirmed the device as one exhibiting a self tuning characteristic and a correspondingly high bandwidth.

The connectors 32 from adjacent nodes 37 can, as in the present embodiment, share a common link, by way of a coupling mechanism 31 on the sub-frame 34. This introduces a coupling force between the excitation force on one node, and the restoring force on the other. This is considered to be a unique feature of the present invention that offers the possibility for an auto-tuning system that adapts itself to irregular incoming energy waves. Other possible coupling configurations have been investigated and are included within the scope of the current patent. These include (but are not limited as such):

1. A mechanism composed of two sets of connectors, one connected to the absorber above the sub frame, while another is connected to a protrusion of the absorber beneath the sub-frame. In this configuration two sliders (each forming a coupling between adjacent nodes) move relative to each other and the sub-frame. The advantages of this system stem from the opposing motions of the sliders when the absorber moves in either of the pitching or heaving modes, resulting in an effective step up gearing and a corresponding reduction in the effective torque.
2. A mechanism composed of two sets of connectors, one above the sub-frame and one beneath the sub-frame and both connected to a common sliding link on the sub-frame. In this configuration, a pendulum mass supported via a universal joint from the bottom of the upright, and driven from the lower of the two sets of connectors, can be arranged such as its motion tends to increase the displacement within the oscillatory cycle, or presents a substantially beneficial contribution to the restoring force.
3. Coupling can be achieved by a rope drive 27 that also functions as a power transfer device (described later). In this instance a winch or rotating barrel 24, located in the centre or mid point of the link mechanism, can be used to couple the motion of adjacent nodes. The rope can be attached as in FIG. 2 such that a motion of either positive heave or positive pitch causes the barrel to rotate in a clockwise motion, while an absorber motion of negative heave or negative pitch is associated with an anticlockwise motion of the barrel. By leading ropes from adjacent nodes to the same barrel an approximation to the ideal coupling can be achieved.

Power Take-Off

Provision for the further conversion of energy—from mechanical to electrical or hydraulic (although not exclusively)—can be included, through standard conversion techniques, either at the point of relative movement between the absorber and the upright, between the sliding connection and the sub-frame, or through the angular displacement of the uprights relative to the sub-frame. Combinations of these techniques are also allowed for.

The standard conversion techniques may include, although are not restricted to;
1. Some means of rectifying the flow of power, such as a rectifying gear, diode, or non-return valve.
2. Some means of adjusting the resistance to motion, or damping, of the power conversion system.
3. Some means of adjusting the restoring force, or spring, of the power conversion system.
4. Some means of storing energy such as a battery, accumulator, capacitor array or mechanical flywheel, such that it can be released back into the system at the appropriate time to result in an overall reduction in the variance of the developed power.

In addition, a good PTO design will:
1) require as few components as possible
2) Operate all components as close to their peak operating point for as much of the operating time as possible
3) contain as few potential failure modes as possible
4) Operate in a failsafe manner In addition to the primary conversion stage described above, it is likely that a further energy conversion stage will be required before a suitable end product—which could be electricity, desalinated water, hydrogen or a further product whose value increases upon the application of power, in particular when that power is applied intermittently, or in a remote marine environment—can be delivered.

In addition to the secondary conversion stage, it will be beneficial to aggregate the power developed from all the primary conversion points. This may happen before, or after, the secondary conversion stage, with the key design decision being based primarily on considerations of cost and efficiency. It is anticipated that the optimum solution for the complete power conversion system will depend to a large extent on the scale of the specific device.

It is also pointed out that the most suitable combination of elements will be dependant to some extent upon the size of the structure and the characteristics of the site. A more energetic site may be better suited to a larger structure, allowing enhanced revenue per node. In this instance, the additional cost of a more efficient power take off configuration is likely to produce a return over the lifetime of the device. In addition a larger device may be more amenable to regular on-site maintenance and again can support a more sophisticated power take off system. By contrast, sites with comparatively low energy yield may well be better suited to a simpler, less expensive and more robust systems and it these considerations that are likely to drive an involved optimisation procedure before decisions on the ultimate configuration can be made.

PTO Embodiment: Hydraulic

Hydraulics systems are well suited for use in the primary power take off systems of wave energy converters. In this case a primary hydraulic device 52 can be used to damp the angular motion of the joint between a link and a node.

A primary hydraulic device can provide a control force to the absorber to maximise the power harvested during a wave cycle provided a means of gearing the system can be incorporated. This can be achieved through a multi-cylinder approach as shown by the Artemis Digital Displacement technology 124, where each cylinder is independently controlled, or by using less sophisticated variable displacement devices such as the swash plate device which can lose efficiency dramatically away from the optimum operating point.

Figure 5:
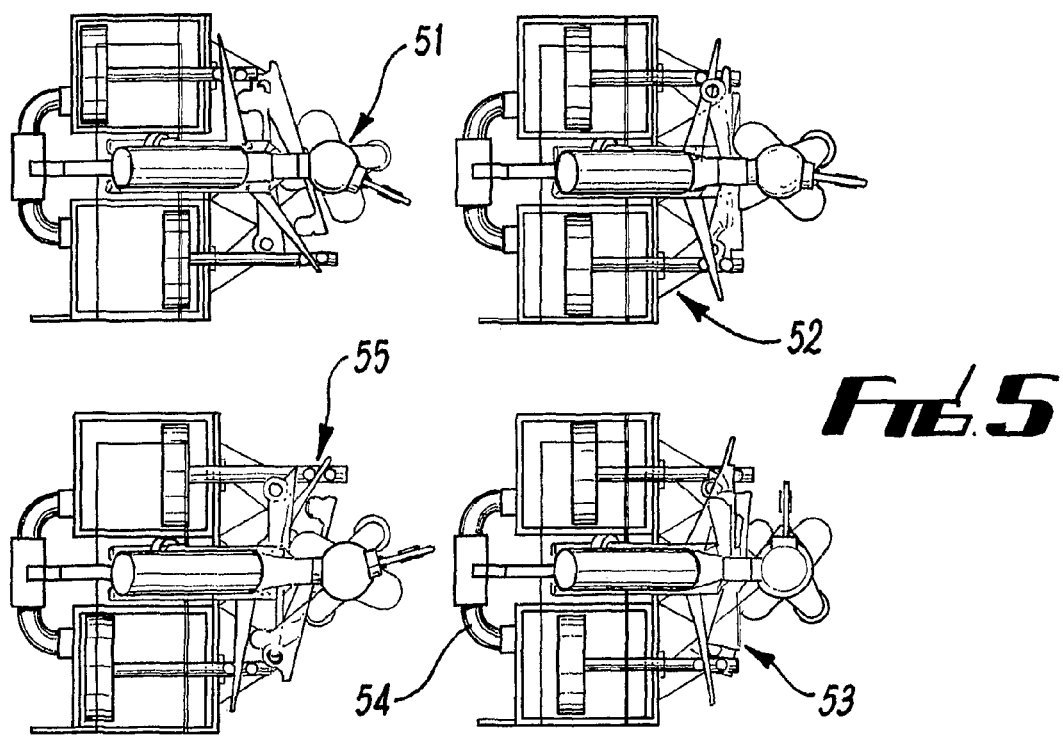
FIG. 5 is a cut through view of a double return cam hydraulic primary assembly.

Other solutions include the ring cam pump advocated by Salter. This can work effectively at low and alternating speeds and does not suffer from the end stop problem. It will however require a back pressure to ensure that the roller does not leave the cam during the cycle. Modifying this design by using two phase shifted cams 51 as shown in FIG. 5 may be used to provide a returning force without the back pressure requirement. In this case, a double lever mechanism 53 operates two single ancting rams 55.

In the most basic system, primary hydraulic devices located in each node would be directly connected to a manifold 54 linking the separate nodes via ducting contained within the link mechanism 36. Rotating fluid transfer unions can be used at the joints to reduce the possibility of fatigue within flexible pipe work.

Accumulators can be included within the array to smooth power fluctuations.

This system would then make use of one or more secondary power conversion modules 91 distributed throughout the array such that the aggregated hydraulic power could be converted to electrical power using a turbine for transmission to shore through an umbilical connection or, alternatively, to fresh water (provided sea water is used as the working fluid) using a reverse osmosis membrane and flexible ducting for ongoing transmission.

The system described above is mechanically one of the simplest options. Using seawater (and suitably non-corrosive materials) a single high pressure manifold is sufficient, there is no control requirement (and therefore no requirement for back up power systems, redundancy, electronics or sensing equipment within the node), the pumps can be of simple and robust construction and the system has far fewer failure modes overall.

These advantages are paid for with conversion efficiency. Manifolding without control has been shown to result in a loss of as much as 50% of the available power. Whereas some control over the mean system pressure may be possible through the secondary power conversion unit (and therefore some matching to the mean wave energy) it will be harder to adjust the accumulators and therefore the smoothing capacity.

PTO Embodiments—Rope Drive

Figure 2:
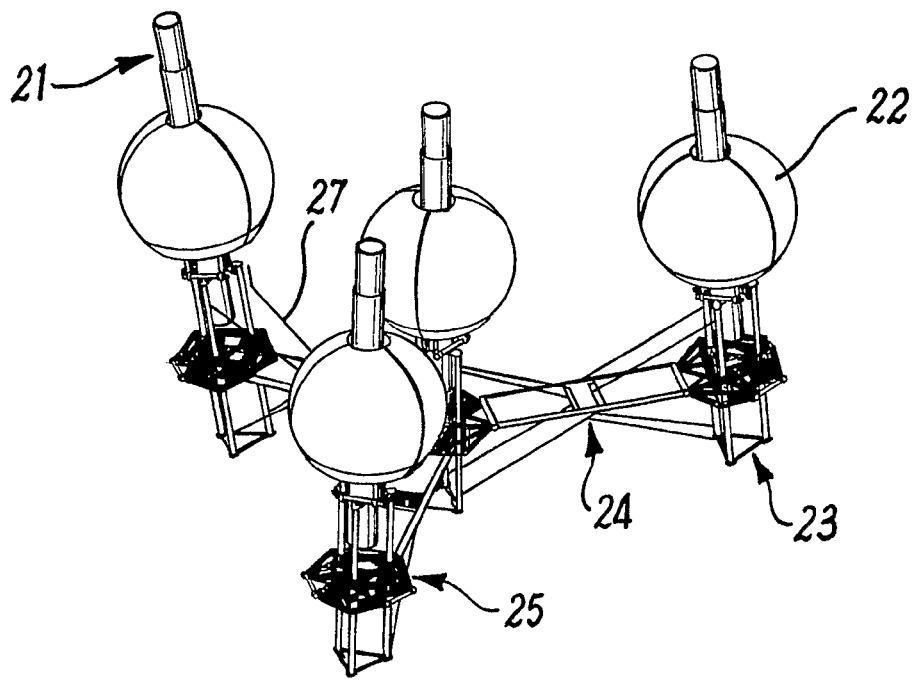
FIG. 2 is a isometric view of four nodes from the hexagonal array.
Figure 3:
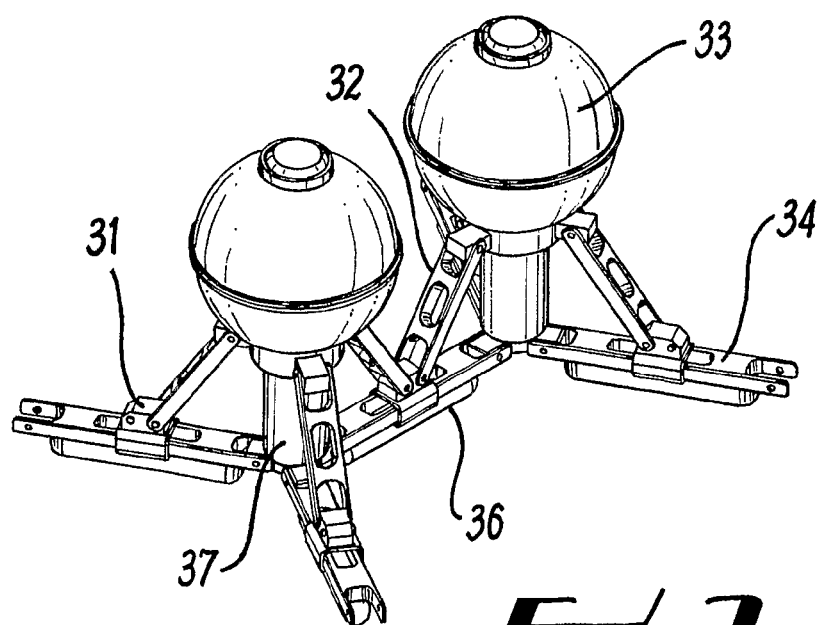
FIG. 3 is a isometric view of two nodes from the hexagonal array with alternate power transmission and coupling system.
Figure 4:
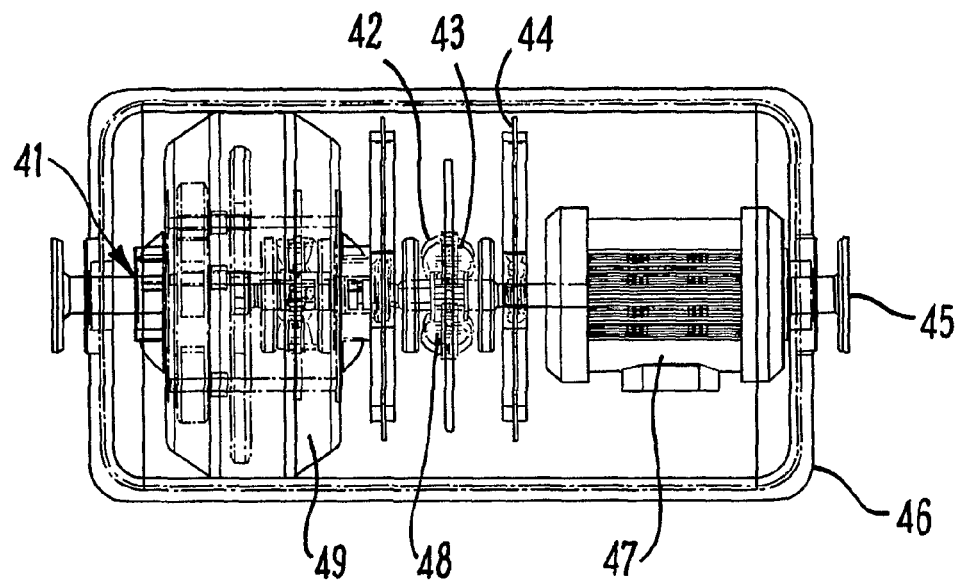
FIG. 4 is a cut away view of the barrel gearbox and generator assembly.

An alternative power take off configuration is illustrated in FIGS. 2 and 4. In this instance, PTO modules 24 comprising step up gearing 41 and rectification (provided through banked epicyclic 49) and differential drives in line with an induction generator 47 and flywheel unit 48). The module is housed within a sealed barrel shaped unit 46 mounted on a central shaft 45. Sealed bearings allow the barrel to rotate round the shaft.

The barrel is driven by means of rope drives 27 linked to the adjacent nodes 25 and absorbers 22. The rope drives provide both the coupling and power transmission. An additional assembly 23 comprising pulleys and a connecting rod is included such that the relative pitch and heave motions of the absorber can both be controlled from a single rope. This mechanism can also be used to tension the drive. One end of the rope is attached to a point on the absorber body, or a protrusion of that body above the link assembly, whilst the other is similarly attached to a protrusion beneath the link mechanism 23. This will allow the drive to operate in both directions.

The barrel will, in this instance, rotate in an oscillatory manner in response to the wave action. Due to the rectification device 49, the shaft will rotate in a single direction. The inclusion of the differential 42 and flywheel 44 will allow the device to store energy between load peaks and regulate the speed of the generator shaft.

The generators can be linked together in a network. In this case the frequency, or speed of each device, is linked such that if one is driven faster than the network it will generate, whereas if it is loaded such that its speed drops beneath that of the generator then it will draw power from the generator. Due to the freewheel gears 43 in the rectifying unit, when running in forward mode the device cannot supply power to the barrel or the absorbers and, when not driven, will provide power only to keep the flywheel running at grid frequency. As the speed of the driven shaft advances beyond this speed the flywheel and generator will speed up and power will be supplied to the network.

The network of all generators can be controlled by a power electronics device that can ensure the quality of the developed power is grid compatible, that the voltage and frequency are suitable for transmission, while at the same time providing a suitable load and frequency to the network to maximise the power absorption from the array.

A Further Embodiment—Flexible Links

A further embodiment of this invention may be achieved by replacing the rigid link members as described previously by flexible members that may be constructed from synthetic mooring lines or a similar flexible medium. This configuration would simplify the mooring operation while still achieving the high spatial utilisation and low material, density offered by the array approach.

In this embodiment the links would provide no resistance to lateral collapse of the array and would, therefore, require a tensioned mooring system to maintain the external shape of the array.

Coupling could also be achieved in a similar fashion using flexible links, although they would only be able transmit force in a single direction which may reduce the effectiveness of the system. Similarly the reactive component of the power take off system may also be limited in its effectiveness using a fully flexible system.

The possible reduction in efficiency of this configuration is likely to be offset by the simplification, and therefore cost reduction, of the mooring operation.

A Further Embodiment—Absorber Mounted PTO.

Figure 10A:
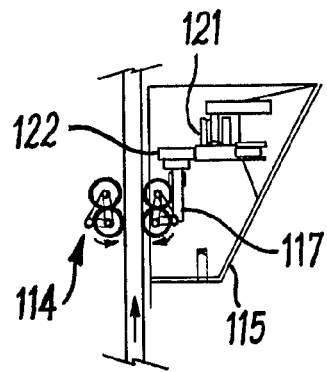
FIG. 10a is a side view of one possible power take off configuration.
Figure 10B:
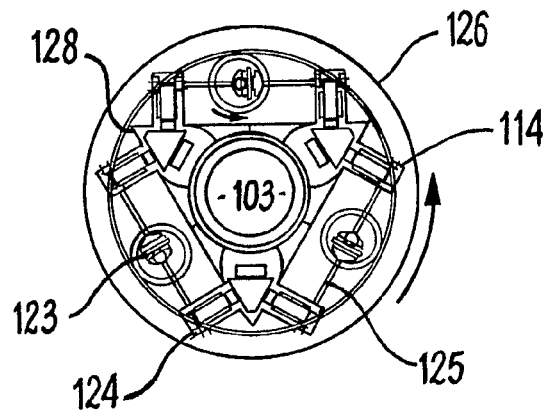
FIG. 10B and FIG. 10c are plan views and front views respectively of the same.
Figure 10C:
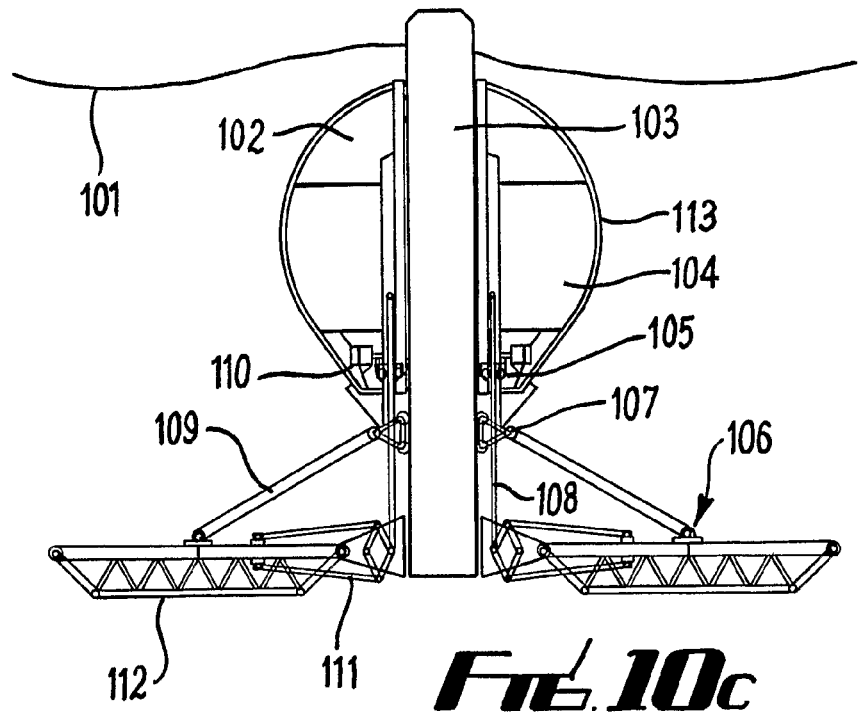

A further embodiment is shown in FIG. 10. In this configuration the Power Take Off mechanism is substantially located in the absorber structure. This approach has the advantage that an isolated absorber can be removed from the array during operation, thereby allowing for change out of faulty components without removing the entire structure from site.

As in other configurations, link frames 112 are attached via a rotating joint to a node and buoyancy unit 103. Coupling links 109 connect adjacent absorbers via a sliding mechanism 106 located on the main link. The absorber 113 encloses three separate volumes: a buoyancy chamber 102 located near the top, a water ballast chamber 104 sized such that when full of sea water the absorber has slight positive buoyancy and a PTO compartment 105 that contains the main conversion machinery.

The absorber structure 113 is attached via a release mechanism to a support structure 115 that is maintained circumferential, although free to move axially, to the main buoyancy tube 103. The support is supported on bearings 107, to both the buoyancy tube and the coupling links 109.

Power is transferred to the absorber by using driving rods 108. Each driving rod is connected, and supported, by a mechanism that converts rotary to linear motion 111 (shown here as Peaucellier's 6 bar linkage) such that a linear motion is derived from the angular displacement of the main rotary joint connecting each link to the node. This results in three driving rods per node.

The advantage of this system is that both angular motion (pitch, sway) and the linear motion (heave) of the absorber can be captured from a single PTO device.

The kinetic energy of the driving rods in transferred to an electrical generator mounted in the absorber. Again the problem of converting low speed oscillating motion to high speed continuous motion requires a solution. In this configuration friction wheels (high density rubber) are mounted on an assembly such that a linear motion in one direction causes the wheels to grip the driving rod. By designing the system with two, intermeshing and equally sized, wheels it can be configured to work in both directions while providing a single direction of rotation on the output shaft 114.

Each driving rod has two friction wheel assemblies, each working underwater. Sealed shafts 124 transfer the power through the wall of the PTO chamber 128. The shafts 125 from adjacent driving wheels are coupled through a differential 123 gear whose output is a vertical shaft 117. An over-running clutch or free wheel drive is located beneath a large power transfer gear 122. This gear meshes with the inside wall of a large diameter, low-speed, permanent magnet, generator (possibly of the air core type to reduce structural weight) 121,126.

This configuration means that only one drive wheel (the fastest) will be delivering power to the generator at any one time. This can be used as an advantage in that, if properly configured, it will induce an orbital motion of the absorber in the horizontal plane, as the power transfer 'rolls' from one driving wheel to the next. This motion will enhance the power capture performance of the device by increasing the apparent capture width of each absorber as well as insuring that angular momentum is maintained and not reversed.

A disadvantage of this PTO configuration is that the freewheel introduces an indirect coupling between the generator and the prime mover that limits the potential for power electronic control, and damping, of unwanted system vibration. Additional or alternative systems based on the absorber mounted PTO that could circumvent this problem include linear direct drive electrical generators on each driving shaft or multi-cylinder hydraulic cam actuated primary devices as described elsewhere.

Moorings and Deployment

The invention described here has been specifically designed to reduce the overall mooring requirement. By mooring the array as opposed to mooring multiple independent devices, the number of individual operations required to install a site capacity is massively reduced. Multiple independent mooring systems, even if they can be designed to share anchors, will require many mooring lines and a cluttered subsea environment. Power umbilicals from each device will have to be led to a subsea junction box or manifold system generally leading to onerous operational requirements for arrays of individually moored devices.

The invention described here, by contrast, allows for pre-connection of umbilical's or manifolds before the array is deployed on site. The array can be moored in a single operation. There are no requirements on the accuracy of individual mooring systems and mooring tolerances are generally increased.

Figure 7:
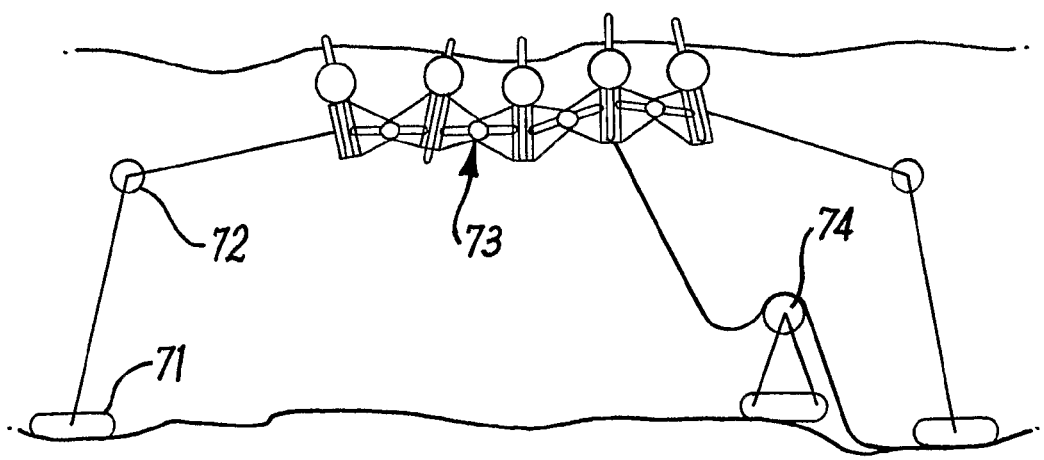
FIG. 7 is a side view of the proposed mooring layout.

The preferred embodiment is for the device 73 to be moored compliantly, using fully submerged floats 72 to generate a pretension between the device 73 and the mooring point 71. This is shown in FIG. 7.

The inventions as described here, if equipped with a power take of system that allows 180 degrees of rotation of the principle link-node joints before encountering an end stop constraint, can be readily reconfigured into a transport mode as illustrated in FIG. 11. The structure 140 comprises two linked lines 142 and 144 each comprising, link members 146 and node/absorbers 148. The link members are arranged to maximise the angle between links which flattens out the whole structure. Flattening the structure reduces its lateral extension, such that the towing operation can be achieved with a substantial reduction in drag and an overall increase in maneuverability.

Figure 12:
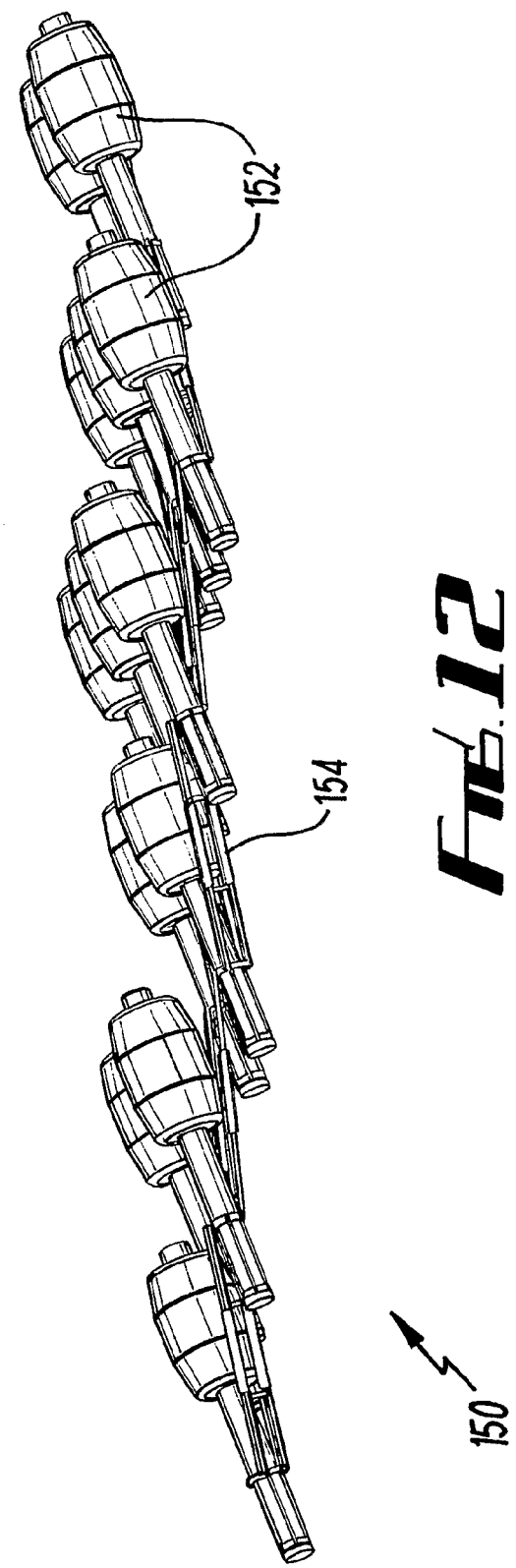
FIG. 12 shows the embodiment of FIG. 12 in it's partially folded configuration.

FIG. 12 shows a similar geometry to that of FIG. 11. The embodiment of the device 150 shows the nodes/absorbers 152 flattened out relative to the link members 154 with which they are substantially coplanar.

Figure 13:
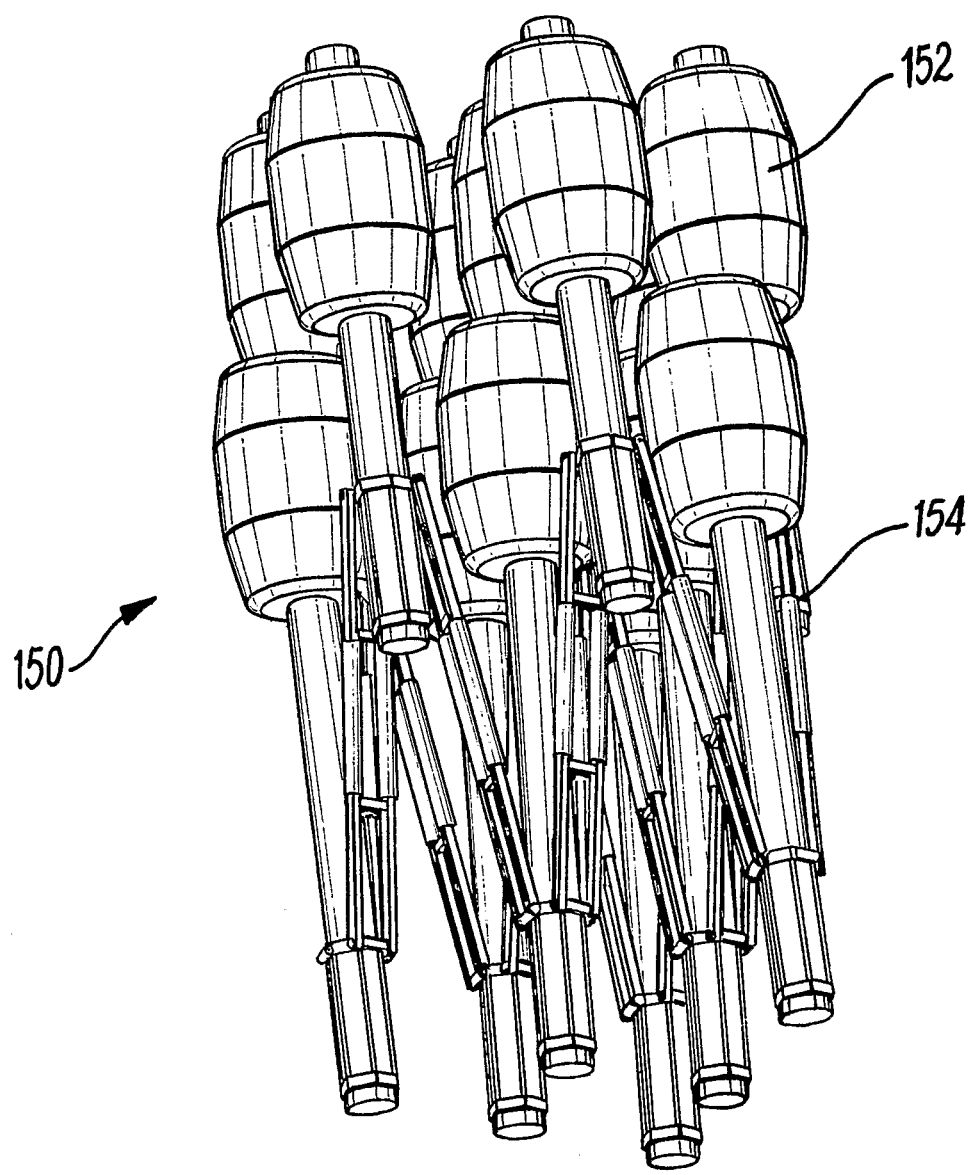
FIG. 13 shows an embodiment of the present invention in it's fully folded configuration.

FIG. 13 show a further geometrical arrangement of the node/absorbers 152 and links 154. In this case, the links are folded up to minimise the angle between adjacent links in a given direction along the device. This has the effect of making the overall shape of the device extremely compact.

Operations and Maintenance

The invention described here can be adapted for onsite maintenance by controlling the buoyancy and mass distribution and by designing the structure such that it includes suitable dual purpose walkways 62, access areas and safety precautions. These features can be integrated neatly within the design as described in the following.

Figure 6:
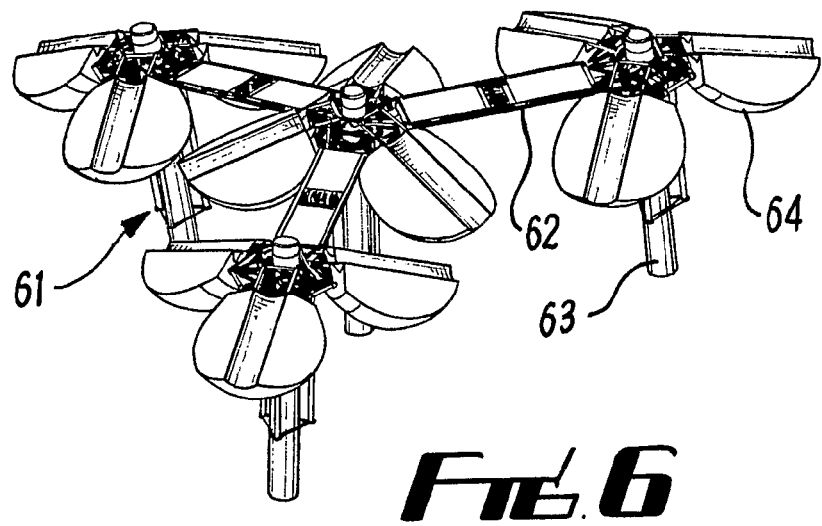
FIG. 6 is an illustration of four nodes from the hexagonal assembly in the offshore maintenance configuration.

The link assembly 62—being composed of a series of horizontal rectangles—can be designed in such a way that when the structure is elevated above the free surface they become a series of walkways connected, and supported, by the nodes 63 which provide the main buoyancy requirement. This configuration is illustrated in FIG. 6. Stability in the maintenance state is enhanced by using a three part absorber 64 that opens out as the support structure 61 is translates relative to the node 63.

In this configuration the absorbers are constructed from three segments 64—each hinged along its lower edge. When in operation, buoyancy compartments in the top half of the absorber sections create a force that is resisted by a tension in the power take off system and a contact force between the absorber sections. This force tends to keep the absorber in its predominantly spherical shape during operation. As the link assembly is raised above the surface the sections will tend to peel away from the node core by rotating around their hinged axis. Thus, when the link assembly is raised above the water, the absorber sections adopt the configuration depicted in FIG. 6 and provide considerable additional stability, buoyancy and security to the overall structure.

Survivability

An important requirement of a wave energy converter is the ability to survive extreme weather and storm conditions. This invention includes the possibility for complete submersion of the device which consequently massively reduces the loading on the structure.

The current invention includes a mechanism 21 that allows the distance between the submerged sub frame and the waterline (the point of submergence of the buoyancy elements where the buoyancy force equals the supported weight) to be varied. By increasing the distance the absorbers can be lowered, in a controlled and retrievable fashion, beneath the more aggressive action of the waves. As the wave energy decreases exponentially with depth, this strategy will allow the device to continue generating at close to its optimum power even when the waves are above the design condition.

Reference is made to the figures to illustrate selected embodiments and preferred modes of realising the invention. It is understood that the invention is not hereby limited to those aspects as described in the figures.

FIG. 8 depicts one possible deployment configuration. The hexagonal arrangement of nodes 85 and rigid members 88 are shown. This configuration is attached to a series of single point moorings 83 which are connected to the sea bed using a conventional mooring arrangement such as an admiralty or catenary type 81. The connection to the array is made via flexible synthetic lines 84. A power take-off module 87 is positioned on the rear side of the array with respect to the incoming dominant wave regime 82. The power take-off module is independently spread moored 86. Not shown in this figure is the power umbilical connection to the shore.

FIG. 9 depicts another possible deployment configuration. Again the hexagonal array of nodes 94 and rigid members 95 is shown. In this configuration secondary conversion take-off modules 91 are incorporated the array alongside primary conversion nodes 94. The array is attached to a series of single point moorings 92 using taut synthetic lines 93. This figure does not depict the power umbilical arrangement connecting the power take-off modules to shore.

The layout of the umbilical connection to shore can be seen in FIG. 7. The umbilical is depicted curving over a submerged barrel 74 to lessen the effects of dynamic interaction with the sea bed on the structural integrity of the cable.

Based on this specification, the invention presented here provides the following solutions:

1. A structure that presents a large capture width, while utilising the single point absorber effect, and minimising the structural requirements.
2. A structure that can absorb energy from any incident direction.
3. Systems for extracting and converting mechanical power developed by the structure into electricity or other products.
4. A structure that can absorb energy from both pitch and heave, or potential and kinetic energy.
5. A means of mechanically coupling the responses of individual nodes to promote the correct relationship between the incident forces on, and velocity of, individual nodes.
6. A structure that is readily amenable to mass manufacture using available techniques.
7. A structure that can be moored as an array—considerably simplifying the mooring operation and reducing the mooring costs.
8. A means of maintaining the structure on site.

Improvements and modifications may be incorporated herein without deviating from the scope of the invention.

The invention claimed is:

1. A wave energy transformation device comprising an array of members connected together to form a structure having a substantially hexagonal geometry, wherein members of the array of members comprise an absorber which is coupled to a buoyancy element; and a plurality of link members which connect the absorber and buoyancy element to similarly coupled absorbers and buoyancy elements to form the array, and a common attachment on each link member connects adjacent absorbers together, wherein the relative motion of at least some of the members of the array, as caused by the energy of wave motion in a medium to which the array is coupled, causes an angular adjustment between the link members and the buoyancy elements that accompanies deformation of the structure, the angular adjustment being expressed at a joint mechanism on the link member, said relative motion being convertible to another form of energy by a power take off system; and wherein the buoyancy element maintains a neutral or slightly positive buoyancy and restrains the vertical location of the plane of the joint mechanism on the link member to a position submerged in the medium and wherein, the absorber is coupled to the buoyancy element such that the absorber and the buoyancy element share an axis about which the form of the absorber is axisymmetric and the form of the buoyancy element is also axisymmetric and the absorber can translate in a predominantly axial vertical direction relative to the buoyancy element.

2. A device as claimed in claim 1 wherein, the link member supports a rotating connection.

3. A device as claimed in claim 1 wherein, the members of the array are adapted to receive three link members with an angular spacing of around 120°.

4. A device as claimed in claim 1 wherein, the joint mechanism comprises three joints, such that a connection to the corresponding joint at one end of a link member is facilitated.

5. A device as claimed in claim 1 wherein, the buoyancy element is maintained at an offset from the joint mechanism such that the joint mechanism is locatable substantially beneath the most aggressive motions of the wave particles as explained by the exponential decay of said particles motion with depth.

6. A device as claimed in claim 5 wherein, the offset between the joint mechanisms and the buoyancy element can be varied to allow the device to be tuned to a specific wave climate.

7. A device as claimed in claim 6 wherein the ratio between the mass and displacement of the buoyancy element is varied by the controlled flooding of buoyancy compartments within the buoyancy element.

8. A device as claimed in claim 1 wherein, the absorber is substantially spherical or axisymmetric in form.

9. A device as claimed in claim 1 wherein, the absorber is larger relative to the buoyancy element.

10. A device as claimed in claim 1 wherein, the array when deformed by a wave pattern uses the reactive forces of its members in such a way as to permit the transformation of the wave energy into another form of energy.

11. A device as claimed in claim 1 wherein, the device uses the geodesic properties of its substantially hexagonal form to conform to wave patterns.

12. A device as claimed in claim 1 wherein, the motions of adjacent members of the array are mechanically coupled to provide a complimentary restorative force that acts to enhance the power capture characteristics of the device.

13. A device as claimed in claim 1 wherein, the device can use the device's own created energy to rebalance the device's floatation system to allow the device to sink below surface level during periods of bad weather.

14. A device as claimed in claim 1 wherein a mechanical, electrical, hydraulic or pneumatic coupling is provided between adjacent absorbers to improve the correlation between the forces on, and motion of, individual absorbers.

15. A device as claimed in claim 1 further comprising an assembly of the following mechanical components: step up gearbox, rectification gearbox, flywheel and differential drive, which produce a steady, or quasi steady, unidirectional power flow to an electrical generator.

16. A device as claimed in claim 1 further comprising an assembly of hydraulic devices which produce a steady, or quasi steady, unidirectional power flow to an electrical generator.

17. A device as claimed in claim 1 further comprising, a multiple inlet/multiple outlet manifold for use in power transmission and power smoothing.

18. A device as claimed in claim 1 wherein a variable speed drive or assembly of power conditioning electronic devices is used to produce a steady, or quasi steady, unidirectional power flow to an electrical generator.

19. A device as claimed in claim 18 wherein the variable speed drive or assembly of power conditioning electronic devices is used to damp unwanted mechanical vibrations or otherwise control the mechanical response of the structure.

20. A device as claimed in claim 19 wherein the device is foldable to create a substantially planar shape which is suitable for transportation.

21. A device as claimed in claim 1 wherein the link members and buoyancy elements can be elevated, partially or substantially, above the free surface to form a network of walkways allowing limited on site maintenance and repair.

22. A device as claimed in claim 1 wherein the structure can be folded, reconfigured or aligned in any way during marine operations to ease the handling or maneuverability.

23. A device as claimed in claim 22 wherein the device is foldable to minimise the distance between members of the array thereby producing a compact shape suitable for storage.

24. A device as claimed in claim 1 wherein the structure is maintained on station during normal operation by a mooring attachment.

25. A device as claimed in claim 1 wherein the waves are sea waves.

26. A device as claimed in claim 1 wherein the waves are in a medium other than water.

27. A device as claimed in claim 1 wherein the device is for the production of power or any other product that may be sold to generate revenue.

28. A device as claimed in claim 1 wherein the medium is water.

* * * * *